US005281985A

United States Patent [19]

Chan

[11] Patent Number: 5,281,985

[45] Date of Patent: Jan. 25, 1994

[54] VIDEO VIEWING SYSTEM FOR A VEHICLE

[76] Inventor: Michael Chan, 7110 Clarendon St., San Jose, Calif. 95129

[21] Appl. No.: 885,503

[22] Filed: May 19, 1992

[51] Int. Cl.[5] .................................... G03B 21/00

[52] U.S. Cl. .................................... 353/13

[58] Field of Search .................... 353/13, 12, 11, 15, 353/19, 79, 122; 358/229, 254, 335, 341, 343, 347

[56] References Cited

U.S. PATENT DOCUMENTS

| | | | |
|---|---|---|---|
| 900,522 | 10/1908 | Gravell et al. . | |
| 1,632,973 | 6/1927 | Johanknegt . | |
| 1,987,710 | 1/1935 | Robbins . | |
| 2,066,158 | 12/1936 | Patterson | 353/13 |
| 4,312,577 | 1/1982 | Fitzgerald | 353/12 |
| 4,737,927 | 4/1988 | Hanabusa et al. | 395/135 |
| 4,908,611 | 3/1990 | Iino | 353/13 |
| 5,089,826 | 2/1992 | Yano et al. | 364/449 |

*Primary Examiner*—William A. Cuchlinski, Jr.
*Assistant Examiner*—William C. Dowling
*Attorney, Agent, or Firm*—Rosenblum, Parish & Isaacs

[57] ABSTRACT

A video viewing system for a vehicle including a vehicle having a battery which, through an inverter, powers a video and audio generating source. The source transmits video signals to a projector which is also powered by the vehicle battery. The projector is affixed to the vehicle, and operative to project video images onto a screen. The screen is removably attached to the hood or a bumper of the vehicle and disposed in cooperation with the projector. The source transmits audio signals to the vehicle's sound system via an adapter or to an independent sound system. An optional multi-output jack can be connected to the audio output of the source to connect the sound systems of multiple vehicles to the source in the host vehicle.

25 Claims, 7 Drawing Sheets

VIDEO VIEWING SYSTEM FOR A VEHICLE

BACKGROUND OF THE INVENTION

1. Field of the Invention

This invention relates generally to a system for viewing a video while seated in a vehicle where the projector and screen are attached to the vehicle, and more particularly to the combination of a projector, screen, source and vehicle, where the projector and screen are attached to the vehicle and disposed in cooperating fashion with each other, and the source supplies video signals to the projector and audio signals to the vehicle's sound system through an adapter, where the source, projector and sound system are powered by the vehicle's battery.

2. Brief Description of the Prior Art

To date there have been many systems for projecting signals from a source, such as a VCR tape or receiver, onto a screen for viewing purposes. Most of the time a sound system is connected to the source for audio effects in addition to the video presentation.

The viewing can be accomplished in an enclosed area, customarily in a home or conference room. The source, projector and sound system are plugged in to the house power (the 110 volt outlet). Although it is possible to operate these components using a battery for power, the use of a battery is not common because most every viewing area is equipped with enough 110 volt outlets to power all of the components.

To date, the only combination of a video viewing system and a vehicle has been the drive-in movie theater. The screen, as well as the sound speakers, are fixed in their locations, making the drive-in theater non-portable. The sound quality of the sound system at most drive-in theaters is poor. Because the components are exposed, drive-ins cannot operate during rain or snow. The images projected onto the drive-in screen cannot be seen during daylight and therefore the drive-ins can only operate at nighttime.

Although many video viewing systems exist and have existed for almost a decade, none has been specifically designed for mobile or portable use. By projecting an image from within the cab of a car or truck onto a screen situated at one end of the vehicle (such as attached to the front bumper or atop the hood), a video may be viewed in one's own vehicle regardless of the location of the vehicle. The system is mobile (i.e. portable) and is powered from the vehicle's battery. An external sound system is not necessary as the audio effects can be connected through the vehicle's existing internal sound system, such as a cassette deck or CD player. This feature expands the usefulness of expensive car stereo systems. Further, the system provides privacy and reduces disturbance to neighbors, especially those sharing common walls as in apartments or condominiums.

This system can be used in conjunction with any type of vehicle having a battery, such as a car, truck, semi-truck, motorcycle or boat.

SUMMARY OF THE INVENTION

It is therefore a primary objective of the present invention to provide a mobile or portable video viewing system used in conjunction with a vehicle.

Another objective of the present invention is to provide power to a video source and projector from a vehicle battery.

A further objective of the present invention is to provide a forum for viewing a video, where an image is projected from inside the cab of a car or truck, onto a screen that is attached to one extreme end of the car or truck.

Still another objective of the present invention is to provide a video viewing system in a host vehicle, in which the images that are projected from the video source onto the screen can be viewed by the people in the host vehicle as well as by others in adjacent vehicles.

Still a further objective of the present invention is to provide a system including multiple audio output jacks so that the audio signals from the source can be connected to the sound systems of other nearby vehicles in addition to the host vehicle.

Yet another objective of the present invention is to provide a video viewing system that is completely contained within the cab of a vehicle, so that none of the video viewing components is exposed to inclement weather.

Yet a further objective of the present invention is to provide a video viewing system incorporating a cloth car cover draped over a tenting frame to completely shroud the vehicle, thus protecting a screen and a projector mounted to the outside of the vehicle, and allowing the video to be viewed in inclement weather as well as during daylight.

Briefly, a preferred embodiment of the present invention includes a vehicle having a battery which, through an inverter, powers a video and audio generating source (such as a tape player). The source transmits video signals to a projector which is also powered by the vehicle battery. The projector is affixed to the vehicle, and operative to project video images onto a screen. The screen is removably attached to the hood or a bumper of the vehicle and disposed in cooperation with the projector. The source transmits audio signals to the vehicle's sound system via an adapter or to an independent sound system. An optional multi-output jack can be connected to the audio output of the source to connect the sound systems of multiple vehicles to the source in the host vehicle.

An important advantage of the present invention is that it provides a mobile or portable video viewing system that can be set up or dismantled easily and quickly.

Another advantage of the present invention is that it provides a forum for viewing a video from inside a vehicle, where an image is projected from inside the cab of a car or truck, onto a screen that is attached to one extreme end of the car or truck.

A further advantage of the present invention is that it provides a video viewing system in a host vehicle, in which the images projected from the video source onto the screen can be viewed by the people in the host vehicle as well as by others in adjacent vehicles.

Yet another advantage of the present invention is that it provides a video viewing system having at least one screen that can be seen by a plurality of vehicles, where the source includes multiple audio output jacks for connecting the audio signals from the source in the host vehicle to the sound systems of the other vehicles.

Yet a further advantage of the present invention is that it provides a video viewing system that can be completely contained within the cab of a vehicle, so that the system can be operated without risk of damage in inclement weather.

These and other objects and advantages of the present invention will no doubt become apparent to those skilled in the art after having read the following detailed description of the preferred embodiment which is illustrated by the various drawing figures.

DETAILED DESCRIPTION OF THE BEST MODE

Figure 1:
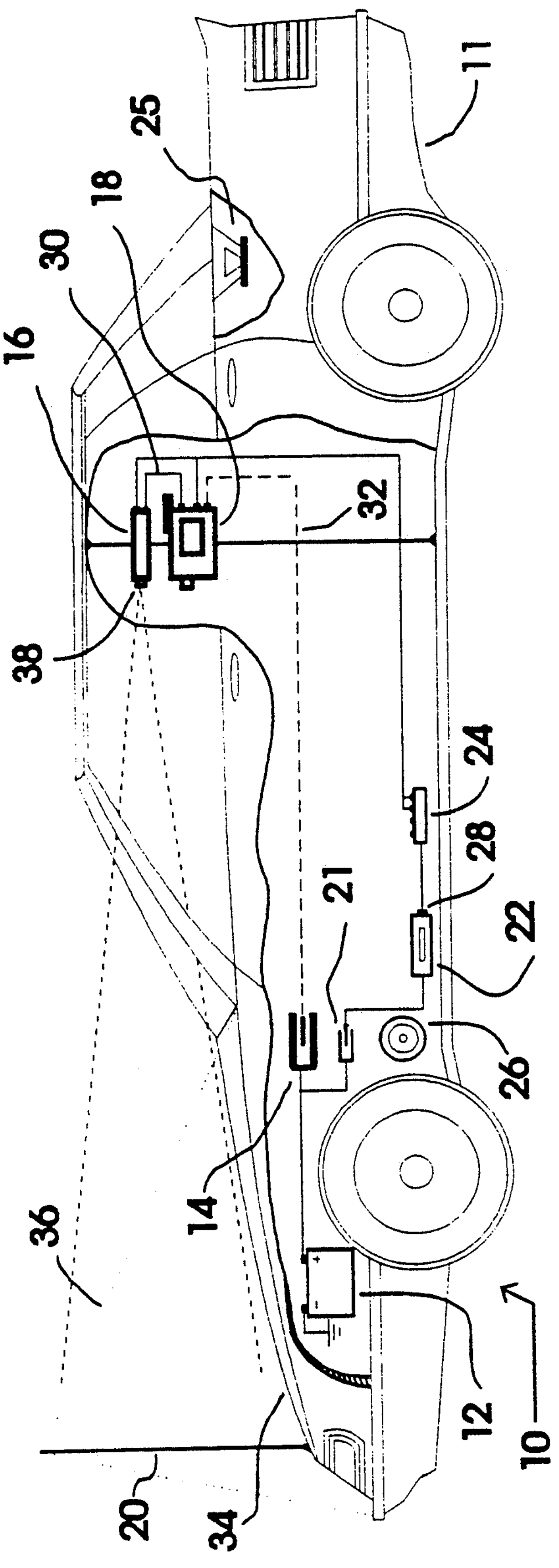
FIG. 1 is a side view of a video viewing system in combination with a standard four-door passenger car, illustrating one embodiment of the system where a projector is mounted within of a vehicle and a screen is fastened to the front hood of the vehicle, further illustrating the video viewing elements.

FIG. 1 is a side view of a standard four door passenger car that includes a video viewing system 10 in accordance with the present invention. As is shown, the video viewing system 10 includes a car 11 having a battery 12, an internal sound system 14, a projector 16, video and audio source 18 and a Viewing screen 20.

In the preferred embodiment, the video viewing system of the present invention is powered by the car's battery 12. Most passenger cars operate on a 12 volt DC battery, while other types of vehicles have 6 volt or 24 volt batteries. The battery 12 supplies power directly to the car's sound system 14 (such as a cassette player) as well as to the projector 16 and source 18 through an inverter 22.

The inverter 22 is connected to the car's battery 12 through the car's cigarette lighter 21 and converts the 12 volt DC supply from the car's battery into 110 volts AC. The inverter 22 preferably has the electrical capacity to provide a minimum of 200 watts continuous and 350 watts peak for electrical accessories such as the projector 16, the source 18, and, in alterative embodiments discussed hereinbelow, an external sound system 14,, even though such wattage may not always be used. The output end 28 of the inverter 22 can be connected to a power strip 24 to provide numerous outlets for plugging in the electrical accessories.

The source 18 is a signal generating device that reads a video media (such as a video tape or laser disc) and creates a video output signal that is transmitted to the projector 16 through video cable 30. Power from the battery 12 is delivered through the cigarette lighter 21 to the source 18 (through the inverter 22), as the source 18 requires 110 volts AC for operation. The source outputs the video signals it generates to the projector 16.

Although any LCD projector can be used in this system, it is anticipated that the relatively new miniature LCD projectors, such as the Fujix P-40U will provide the best mode because of its compact size and lower purchase price. The projector 16, which requires 110 volts for operation, is plugged into the power strip 24 and is connected to the battery 12 through the inverter 22.

The source 18 also provides an audio signal which can be output to the vehicle's sound system 14 through audio cable 32, or output to an independent sound system discussed hereinbelow and not shown in FIG. 1. The sound system 14 is powered directly from the vehicle's battery 12 as this system requires 12 volts to operate. Also shown in this figure is a rear speaker 25 and a front speaker 26 of the vehicle's internal sound system which provide sound.

FIG. 1 also depicts a high gain/resolution screen 20 that is attached to the hood 34 of the car. A suitable screen is generally rectangular in shape. Tie downs 36 hold the screen 20 in a vertical disposition in windy or gusty conditions. The screen 20 is disposed to face the lens 38 of the projector 16, in cooperation therewith, to provide a viewing area for the projected video images. Various alternative locations and mountings for the projector and screen will be discussed in detail below.

Figure 2:
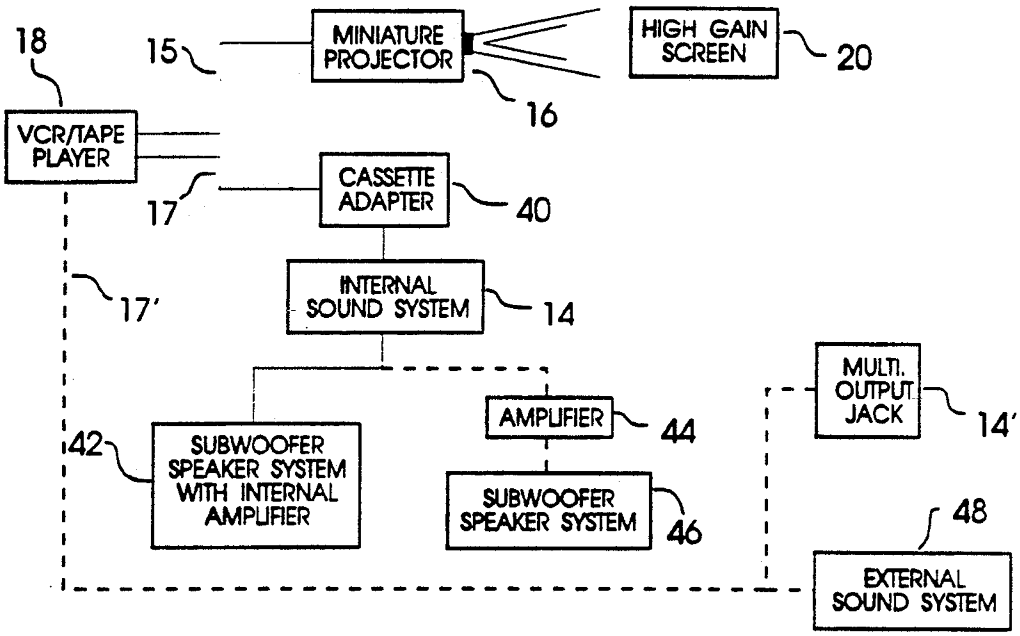
FIG. 2 is a block diagram of the video and audio signal paths from the source through the video viewing system.

FIG. 2 is a block diagram showing the transmission paths of the video signal and the audio signal emanating from the source through the video viewing system. In the preferred embodiment, the source for generating the video and audio signals is a VCR tape player 18. The VCR 18 is connected to a projector 16, in this case a miniature projector 16, such that the video output signal from the VCR 18 is transmitted along transmission path 15 to the projector 16. The projector transmits corresponding video images onto the high gain screen 20.

The VCR source 18 also generates audio signals that are transmitted along transmission path 17 to the internal sound system 14. An adapter 40 is inserted within transmission path 17 to interpret the VCR's audio signals for the vehicle's internal sound system 14 where the sound system is a stereo cassette. The audio effects from the sound VCR tape are then played through the car's internal sound system 14. Alternatively, if the vehicle's internal sound system is equipped with an audio signal input jack (as is with many CD players), then the source can be directly connected to the internal sound system without requiring an adapter.

The sound quality of the car sound system can be enhanced by connecting an additional subwoofer and amplifier system 42. This system 42 will add bass tones to the audio effects, providing a louder and deeper quality to the sound. Shown in dashed lines is an alternative way of connecting an independent amplifier 44 and separate subwoofer 46 to the car's sound system 14.

As an alternative to using the car's internal sound system 14, the audio signal can be transmitted along transmission path 17' from the VCR 18 directly to an independent sound system 14, This embodiment could be used where the vehicle's internal sound system either did not work or was of inadequate quality.

In addition to the sound system 14 of the host car 11 (the car through which the video viewing system is connected), the audio signals transmitted along transmission path 17' from the VCR 1 8 can be transmitted to neighboring cars through a multiple output jack 48. In this way, a number of cars could independently enjoy the audio portion of the tape being played by the VCR 18.

Figure 3:
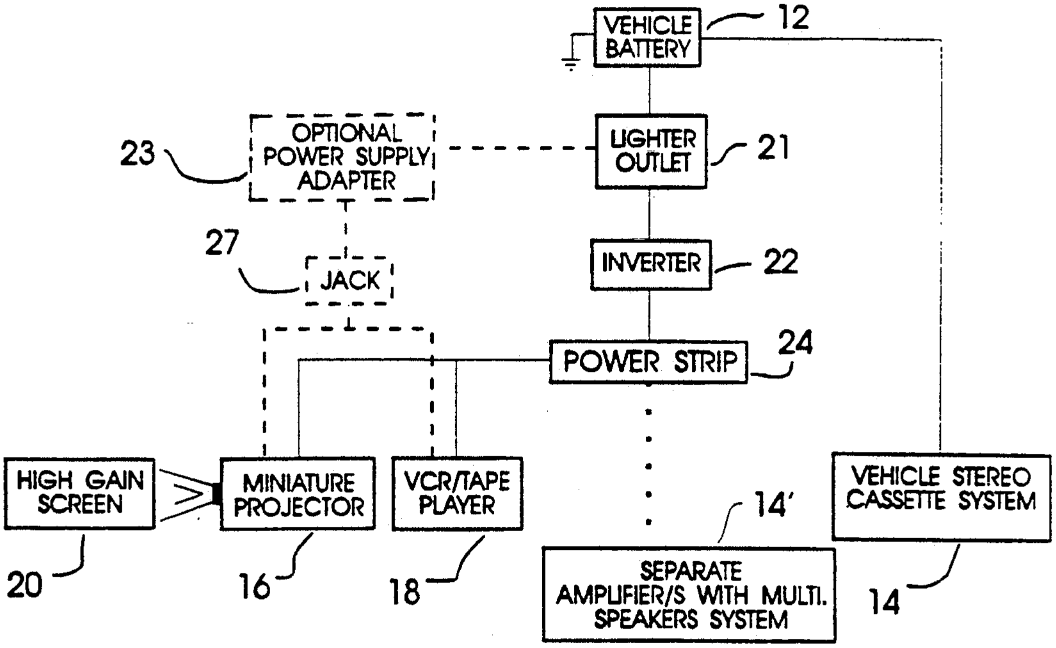
FIG. 3 is a block diagram of the power connections from the battery through the system components.

FIG. 3 is a block diagram of the electrical power connections of a video viewing system in accordance with the present invention. Most passenger cars operate on a 12 volt DC battery 12. In order to power the projector 16 and source 18, 110 volts AC current must be available, and as previously indicated an inverter 22 is utilized to convert the 12 volts DC available from the battery 12 into 110 volts AC. As depicted in FIG. 3, the inverter 22 is connected to the battery 12 through the car's cigarette lighter outlet 21 and a power strip 24 is connected to the inverter 22 to provide multiple outlets for providing 110 volt AC power to the video viewing system components. Shown connected to the power strip is the miniature projector 16 and the VCR 18, whereas the car's internal sound system 14 is directly connected to the car's battery 12. However, where an independent sound system 14, is used, this tent can be plugged into an outlet on the power strip 24 as well, thus receiving 110 volts AC current from the inverter 22. Alternatively, it can be directly hardwired to the battery.

Other than 110 volts AC, some projectors and camcorders operate from a 6 volt (or other DC voltages) power source. Where a camcorder is used as the audio and video generating source (tape player 1B), and the camcorder and projector operate from a 6 volt source, an optional power supply adapter 23, shown in dashed lines, can be connected to the lighter outlet 21. The optional power supply adapter 23 adapts the 12 volt AC power from the battery 12 (through the cigarette lighter 21) to 6 volts in order to power the components. Use of this adapter requires that a multi-jack adapter 27 also be used to provide a plurality of outlets for plugging in the projector 16 and camcorder (tape player 18).

FIGS. 4*a* through 4*h* are side views of a car 11 including a video viewing system in accordance with the present invention showing various mounting methods and locations for mounting the projector 16. While these figures represent various types of projector fasteners, it is not meant as an exhaustive list of all embodiments possible. Many other mounting or attachment means can also be used.

Figure 4A:
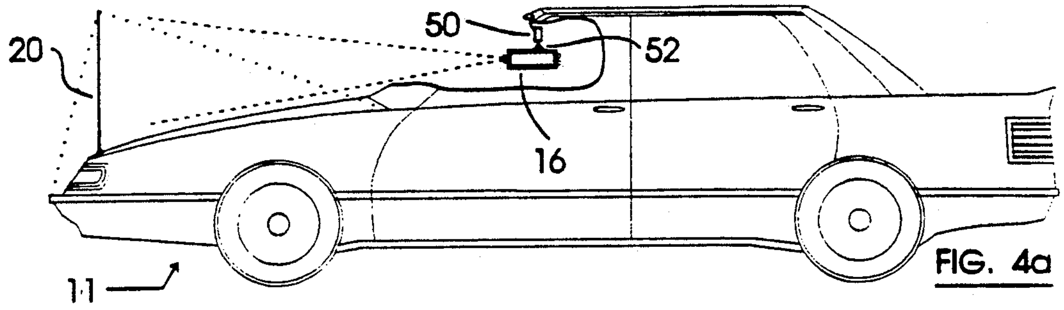
FIGS. 4*a*–4*h* are side views of a car including a video viewing system in accordance with the present invention illustrating various possible locations for, and methods of, mounting a projector on the vehicle.

In FIG. 4*a* the projector 16 is attached to the car's rearview mirror 50 by a clamp and swivel head mounting 52. In this embodiment, the projector 16 is conveniently located for adjusting the projected video image within the confines of the video viewing screen 20.

Figure 4B:
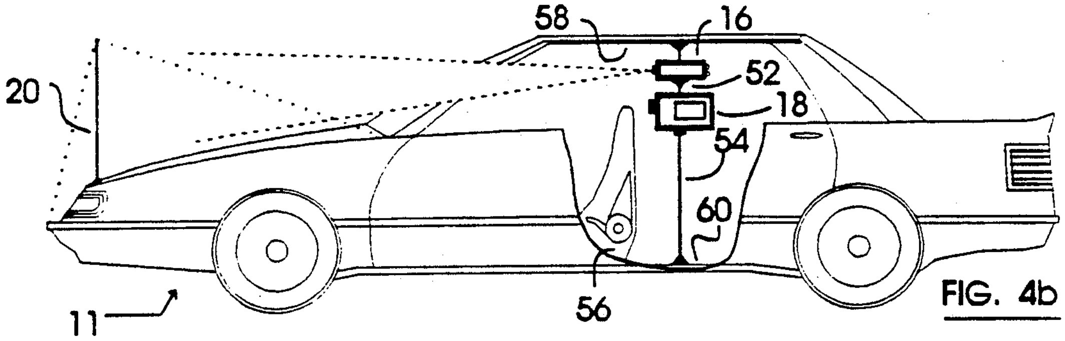

In FIG. 4*b* a spring loaded telescoping pole 54 is placed inside the cab of the car behind the front seats 56. The pole is disposed vertically with on end engaging the inside roof 58 of the car 11 and the other end engaging the floor 60 of the car 11. The projector 16 is mounted to the pole by a clamp and swivel head fastener 52. The spring inside the rod forces the ends of the rod apart to provide a rigid and stable pole for mounting the projector 16. Also shown in this figure is the source 18 which can be mounted to the pole 54 as well.

Figure 4C:
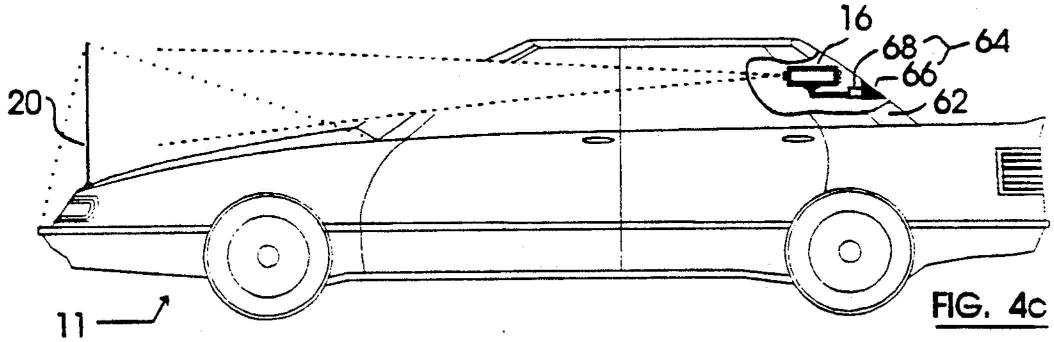

In FIG. 4*c* the projector 16 is mounted to the inside of the rear windshield 62 by a suction cup and swivel head fastener 64. The suction cups 66 of the fastener 64 are caused to grip the inside of the windshield 62, and the swivel head 68 of the fastener 64 allows positioning and aiming of the projector 16.

Figure 4D:
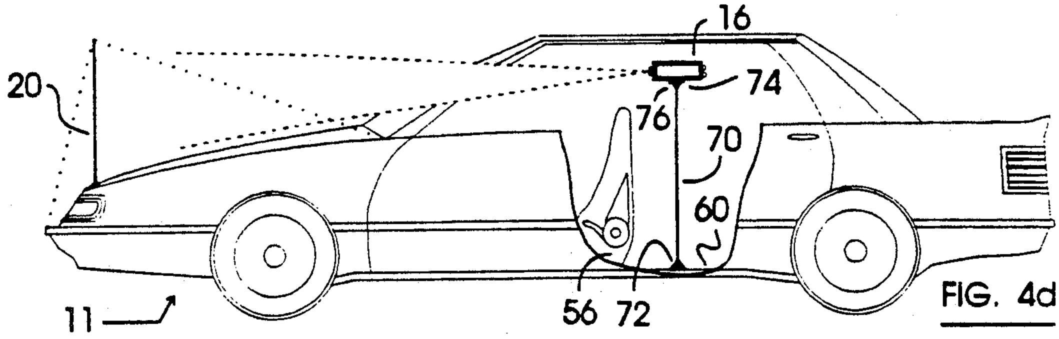

In FIG. 4*d* a flexible stand 70 is fastened at its base 72 to the car floor 60 behind the front passenger seat 56. The stand can be bent to position the projector, and remains rigid following positioning. The top 74 of the shaft includes a swivel head mounting 76 for pivotably mounting the projector 16.

Figure 4E:
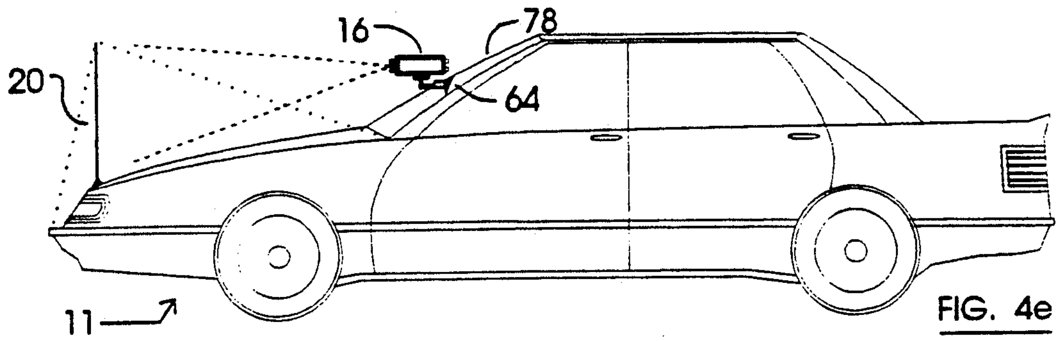

In FIG. 4*e* the projector 16 is mounted on the outside of the front windshield 78 by a suction cup and swivel head fastener 64 as previously described in FIG. 4*c*.

Figure 4F:
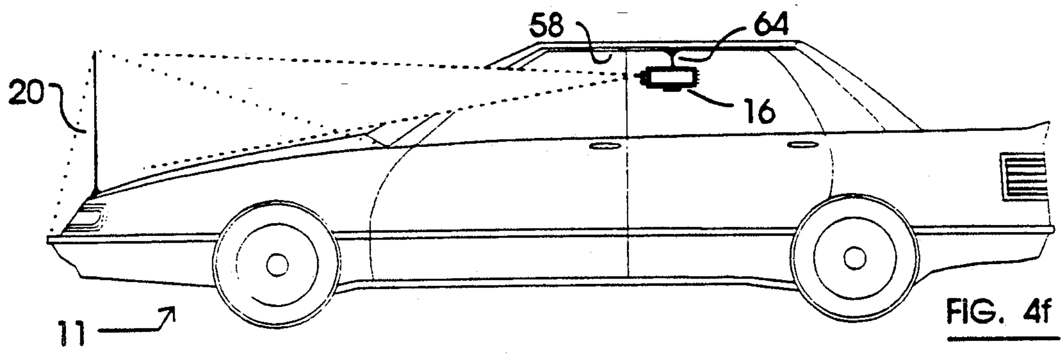

In FIG. 4*f* the same suction cup and swivel head fastener 64 is used to mount the projector to the inside of the roof 58 of the car 11.

Figure 4G:
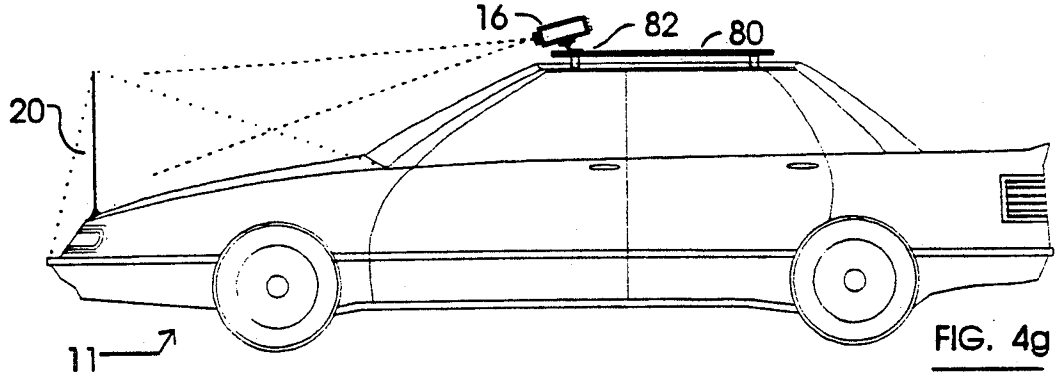

FIG. 4*g* shows the projector 16 mounted atop a roof rack 80. The projector can be attached to the roof rack 80 by clamps or screws 82.

Figure 4H:
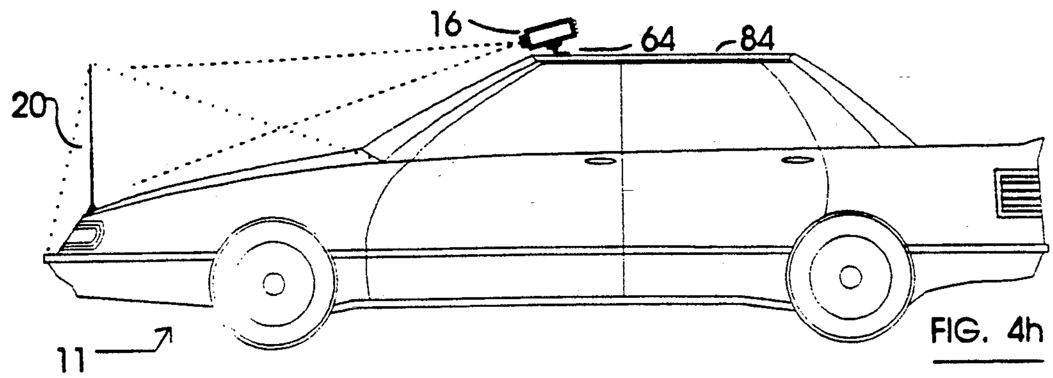

FIG. 4*h* shows the projector 16 mounted directly to the top side 84 of the roof of the car. In this embodiment, the projector 16 can either be attached by a suction cup and swivel head mounting 64, or it can simply rest atop the roof unattached.

FIGS. 5*a* through 5*e* are side views of a car including a video viewing system in accordance with the present invention, illustrating a number of different attachment methods for the screen 20.

Figure 5A:
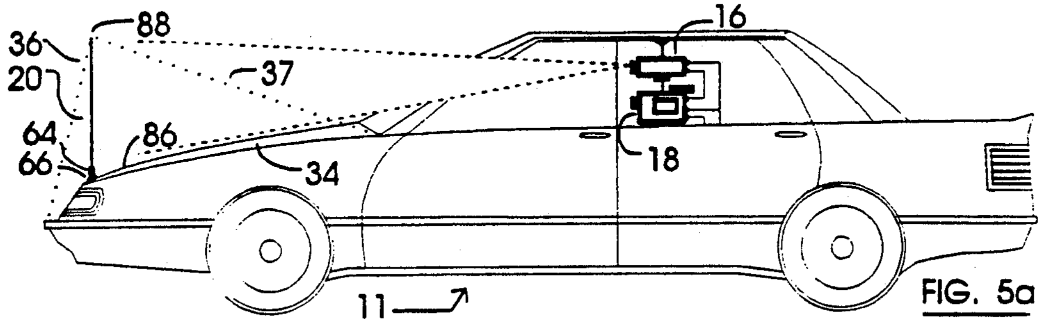
FIGS. 5*a*–5*e* are side views of a car including a video viewing system in accordance with the present invention illustrating various possible locations for, and methods of, mounting a screen on the vehicle.

In FIG. 5*a* the screen 20 is attached to the car 11 via a suction cup and swivel head fastener 64 where the suction cup 66 of the fastener 64 is grippingly engaged to a front portion 86 of the hood 34. Two tie downs 36 and 37 are shown emanating from the top portion 88 of the screen 20. One tie down 36 connects the top of the screen to the front bumper. The second tie down connects 37 the top of the screen to the distal end of the hood 34. The tie downs 36 and 37 provide stabilization in windy or gusty conditions.

Figure 5B:
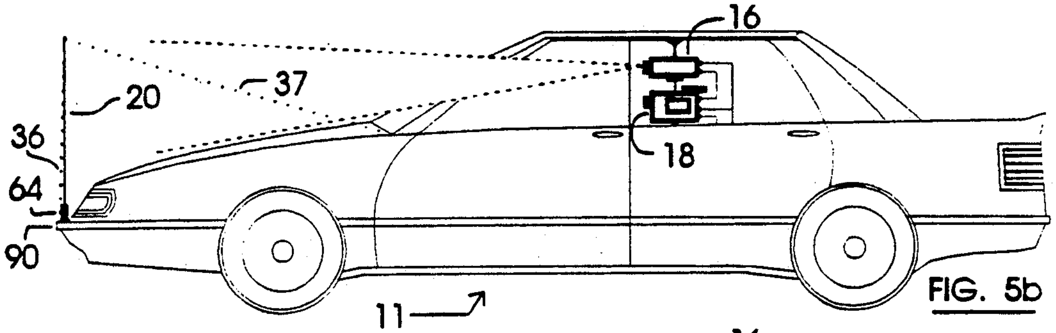

FIG. 5*b* illustrates a screen 20 mounted to the front bumper 90 of the vehicle. Here again, a suction cup and swivel head fastener 64 is used as are two tie downs 36 and 37.

Figure 5C:
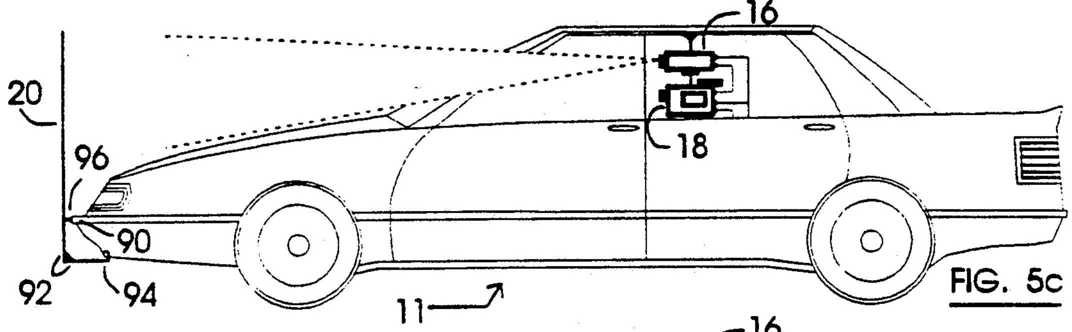

FIG. 5*c* illustrates a clamp mounting 92 for a screen 20. The lower leg 94 of the clamp engages the underside of the front bumper 90, while the optional upper leg 96 of the clamp engages the upper side of the front bumper 90.

Figure 5D:
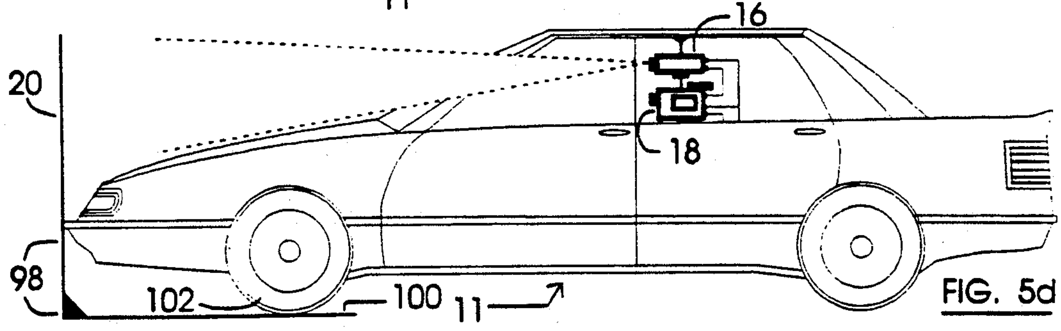

FIG. 5*d* shows a screen 20 connected to a screen stand 98. The screen stand 98 is generally L-shaped having a base leg 100 that is perpendicular to the vertical screen 20. In this embodiment a car 11 is driven forward toward the screen 20 until the front tires 102 of the car 11 rest atop the base leg 100 of the stand 98. The weight of the car stabilizes the screen stand 98.

Figure 5E:
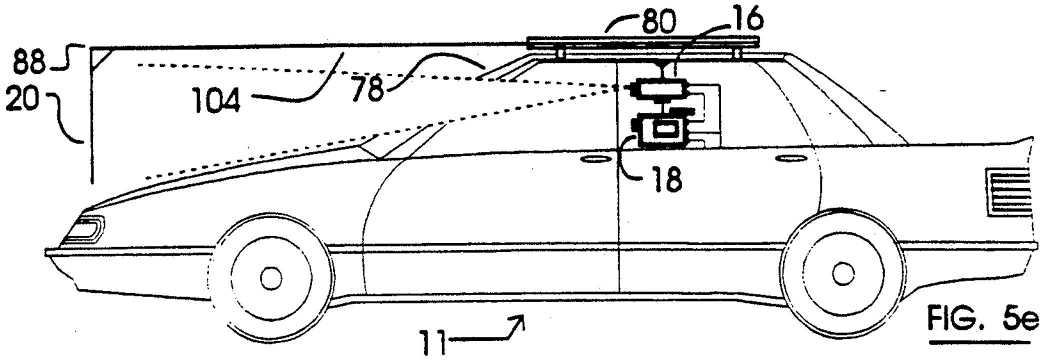

In FIG. 5*e* the screen 20 is attached to an extension arm 104 at the top portion 88 of the screen 20. The elongated extension arm 104 is adjustably attached to the roof rack 80 atop the vehicle. Because the extension arm 104 is adjustable, the screen 20 can be moved closer to the front windshield 78 or farther away as the viewers desire.

Figure 6A:
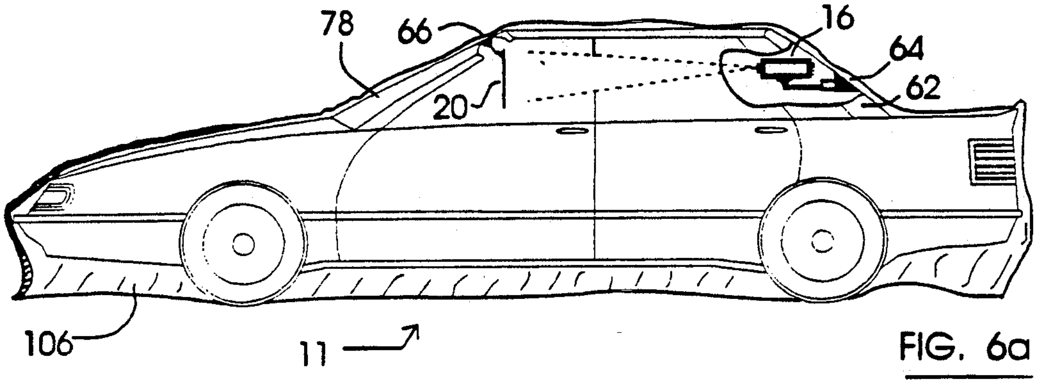
FIGS. 6*a*–6*c* are side views of a car including a video viewing system in accordance with the present invention showing how a car cover can be included to provide shade or protection from inclement weather, and also illustrating alternative locations and methods for attaching a screen to the vehicle while using a car cover.
Figure 6B:
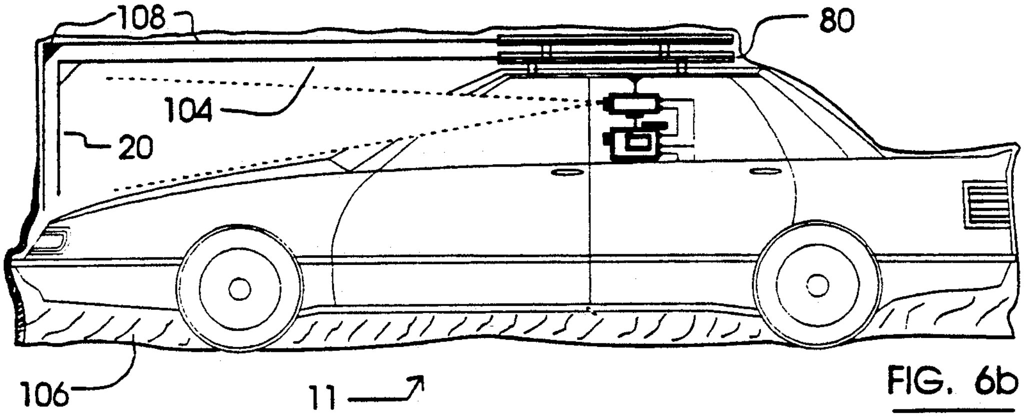
Figure 6C:
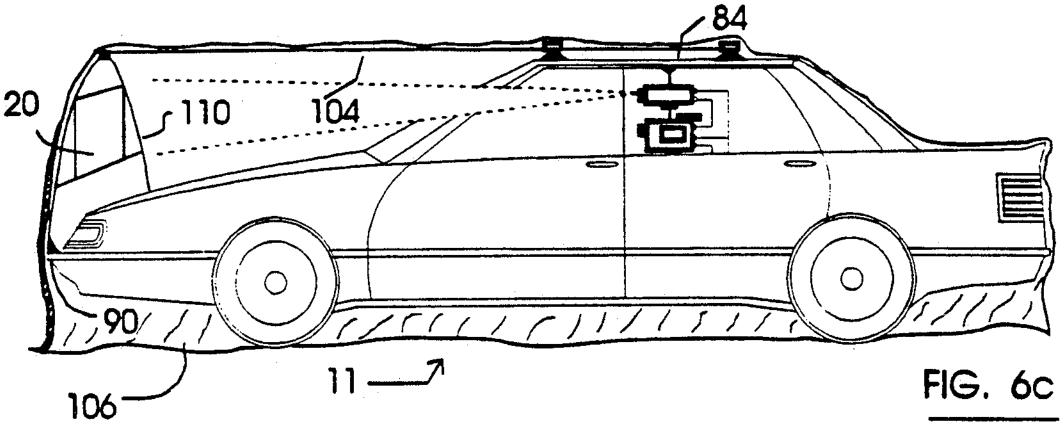

FIGS. 6*a* through 6*c* are side views of a car including a video viewing system in accordance with the present invention, further showing how a car cover can be included to provide shade or protection for the elements of the system if used in inclement weather. These figures also illustrate alternative locations and methods for attaching a screen to the vehicle while using a car cover.

In FIG. 6*a* the car cover 106 enshrouds the car 11 to provide the darkness required to view the video. In inclement weather the screen 20 can be placed inside the cab of the car 11 and attached to the inside of the front window 78 by a suction cup fastener 66. As shown in this figure, the projector 16 is mounted to the inside of the rear windshield 62 by a suction cup and swivel head fastener 64. Occupants inside the car viewing the video would most likely sit in the rear seats. This would not be the case, however, with a van or bus.

FIG. 6*b* illustrates the use of the screen 20 attached to an extension arm 104 in conjunction with a car cover 106. In this embodiment, a frame arm 108 is attached to the roof rack 80 and projected outwardly above the extension arm 104 and behind the screen 20. The frame arm 108 causes the car cover 106 to form a tent over the hood of the car and the screen, to ensure that the car cover 106 does not rest directly on the screen extension arm 104 or the screen 20.

In FIG. 6*c* an extension arm 104 is fastened to the roof 84 of the vehicle at one end, and to a U-shaped loop 110 at the other end. The screen 20 is attached between the legs of the loop. The apex of the U-shaped loop 110 is attached to the extension arm 104 while the open ends of the loop are attached to the car's front bumper 90. In this configuration the loop 110 and the extension arm 104 provides a framework over which the car cover 106 will drape. This configuration creates a tent atmosphere for viewing a video from within the car on either bright days or in inclement weather.

Figure 7A:
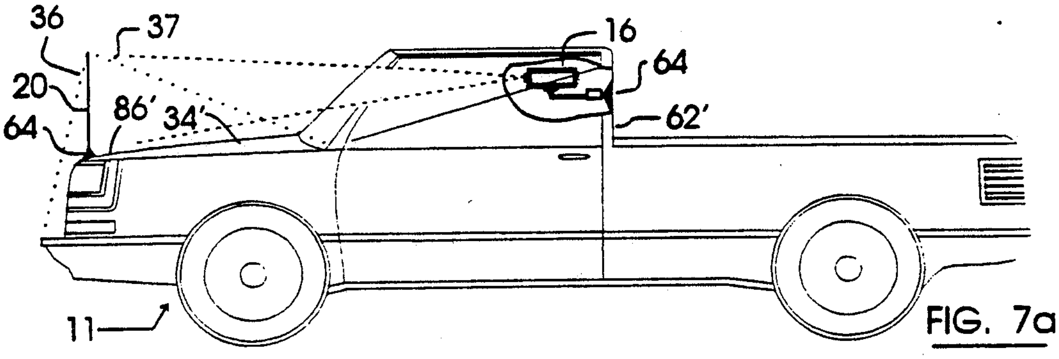
FIGS. 7*a*–7*c* are side views of a standard pick-up truck including a video viewing system in accordance with the present invention illustrating various combinations of projector and screen mounting locations.
Figure 7B:
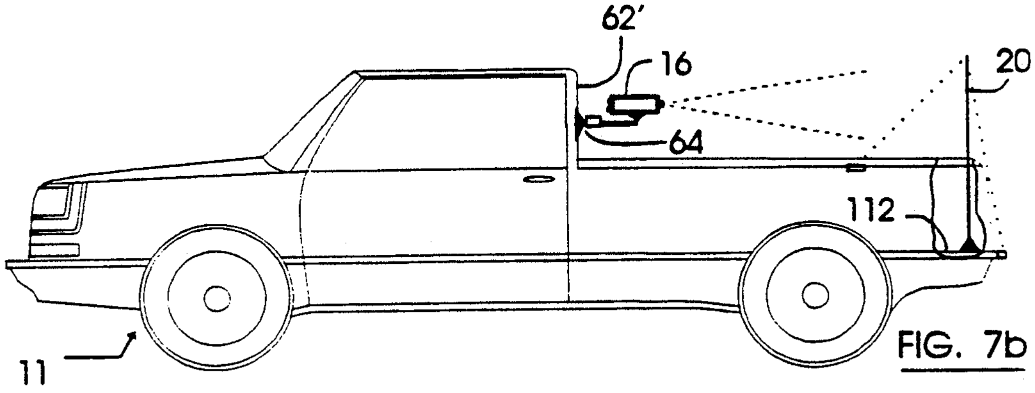
Figure 7C:
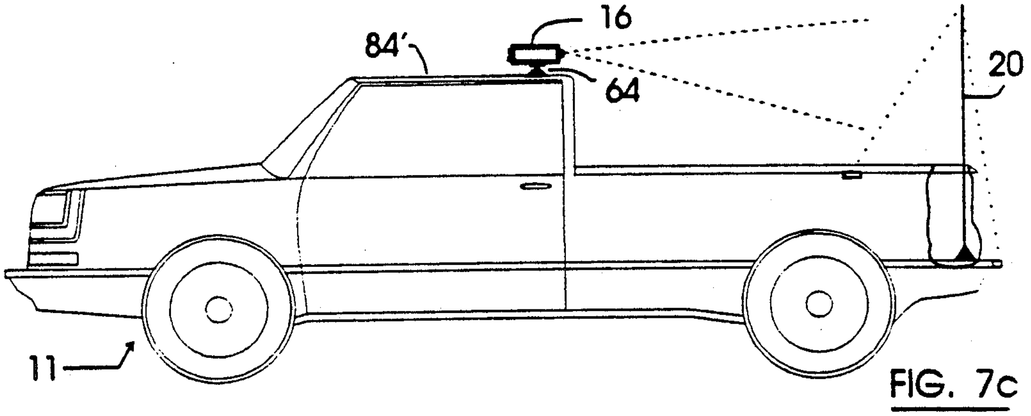

The video viewing system of the present invention can also be used on other types of vehicles such as trucks, motorcycles, and boats. FIGS. 7*a* through 7*c* illustrate the video viewing system in conjunction with a standard pickup truck 13

In FIG. 7*a* the projector 16 is shown mounted to the inside of the rear windshield 62' by a suction cup and swivel head fastener 64. The screen 20 is disposed at the front of the hood 86' and attached thereto by suction cup and swivel head fastener 64 as well. Tie downs 36 and 37 secure the screen 20 to the hood 34' of the truck 13.

FIG. 7*b* illustrates an alternative embodiment for mounting the projector 16 on the outside of the rear windshield 62', again by a suction cup and swivel head fastener 64. As is shown, the screen 20 can be mounted to the inside of the truck bed 112 towards the distal end of the bed 112. Alternatively, the screen can be mounted in the rear bumper. In this configuration, the occupants of the truck viewing the video can either lay down or sit down in the back of the truck facing away from the front of the vehicle in order to watch the movie.

FIG. 7*c* illustrates an embodiment similar to FIG. 7B, except that the projector 16 is mounted by suction cup and swivel head fastener 64 to the outside of the roof 84' of the truck 13. The fastener need not be used as the projector can simply rest atop the roof as well.

The operation of the device 10 is next discussed with reference to FIGS. 1, 2 and 3. A video medium is inserted into the source and the source is turned ON. The source 18 draws 110 volt AC power from the vehicle's battery 12 through a cigarette lighter 21 attached to inverter 22 that converts the 12 volts DC battery output to 110 volts AC through a power strip 24 attached to the inverter 22; the source is plugged into an outlet on the power strip. The source is typically either an electromagnetic I storage device player or an optical storage device player. Some examples of types of sources and their video media are: VCRs and video tapes, camcorders and video tapes, laser disc players and laser discs, CD-ROM players and CDs, TV tuners and an antenna for receiving airwave transmission and a satellite dish for receiving satellite transmissions, a Nintendo® player with joysticks and a Nintendo® game cartridge, karaoke players and laser audio/video discs.

The source 18 sends the video signals to the projector 16. The projector 16 is also plugged into an outlet on the power strip 24 because it too receives 110 volts AC power for operation. The projector is disposed within the cab of the vehicle or atop the roof of the vehicle 11 such that the lens is directed toward a screen 20. The projector 16 transforms the video signal from the source 18 into video images, and projects them onto the screen 20.

The screen 20 is attached to a far end (usually the hood or bumper) of the vehicle 11 and positioned so that it is generally perpendicular with the line of sight of the passengers. Although any sheet of white material can be used for a screen, it is anticipated that a high gain screen will be used as it provides the best resolution.

The audio signals from the source 18 are input into either an independent sound system 14 or into the car's internal sound system 14. Most cars include a cassette player and many new cars have a CD player. Where an independent sound system 14 is used, it is directly connected to the audio output from the source 18. The independent sound system may draw its power from the battery via the inverter as well, or it can be wired directly to the battery. Where the car's internal sound system is used, a cassette adapter 40 translates the audio signal for the cassette deck. On newer model cars, the cassette deck or CD player may be equipped with a input jack for direct plug-in from the source.

The sound system provides the sound that is concomitant with the video from the audio/video medium, through its speakers. The audio portion of the video viewing system is optional. Visual only video presentations can be made when desired. For example, a passenger can narrate along with a video sales presentation or sing along to a video image.

The system can be operated for several hours before the car battery will need recharging. Some inverters will generate an I audible alarm when the battery voltage drops below 10.5 volts. In addition, another type of inverter will shut down the system, prohibiting further draw on the battery, when the voltage output drops below 10 volts. Thus, the battery is never completely drained. When the battery is low, the vehicle is started up to recharge the battery. The video will continue to play, uninterrupted, while the battery is recharging.

The video viewing system of the present invention can be enjoyed by more than just one vehicle. In addition to the host vehicle (the vehicle including the video viewing system elements), other vehicles can be arranged about the host vehicle such that the passengers thereof can see the viewing screen attached to the host vehicle. Alternatively, where two vehicles are viewing a video, one leg of the screen can be fastened to the hood of one vehicle and the other leg of the screen can be attached to the adjacent vehicle. As previously shown (in FIG. 2), the audio transfer cable emanating at the source can be connected to a multiple output jack, which provides audio cabling for connecting the stereo systems of each vehicle viewing the video to the source in the host vehicle.

Although the present invention has been described above in terms of a specific embodiment, it is anticipated that alterations and modifications thereof will no doubt become apparent to those skilled in the art. It is therefore intended that the following claims be interpreted as covering all such alterations and modifications a fall within the true spirit and scope of the invention.

What is claimed is:

1. A video viewing system for use in relation with a vehicle having a power supply means, comprising:

power connection means engaged to said vehicle power supply means and functioning to provide power in a predetermined format, said power connection means having an inverter for converting current from said supply means into a first voltage alternating current and an alarm for sounding when the first voltage drops below a predetermined minimum voltage level;

source means for providing at least one video output signal, said source means being operatively connected to said power means, said source means being selected from the group consisting of a TV antenna and tuner, an electromagnetic storage device player, an optical storage device player, and a laser disc player;

projector means for receiving said at least one video output signal from said source means and converting said video output signal into video images, said projector means being operatively connected to said power means;

a screen for providing a viewing area for said video images, said screen being disposed in cooperation with said projection means such that said video images are projected onto said screen; and said screen and said projector means being removably attached to said vehicle.

2. A video viewing system as recited in claim 1 wherein said source means also provides at least one audio output signal.

3. A video viewing system as recited in claim 2 further including an audio means for receiving said at least one audio output signal and converting said audio output signal into audible sound; said audio means being operatively connected to said power means.

4. A video viewing system as recited in claim 1 wherein said power means provides 110 volt alternating current.

5. A video viewing system as recited in claim 1 wherein said inverter further includes an automatic shut off which is activated when the voltage from the supply means drops below said predetermined minimum voltage level.

6. A video viewing system as recited in claim 1 wherein said electromagnetic storage device player is a VCR.

7. A video viewing system as recited in claim 1 wherein said electromagnetic storage device player is a camcorder.

8. A video viewing system as recited in claim 1 wherein said antennae is a satellite dish.

9. A video viewing system as recited in claim 1 wherein said projection means is mounted to the roof of said vehicle.

10. A video viewing system as recited in claim 1 wherein said projector means is fastened to a rearview mirror within said vehicle.

11. A video viewing system as recited in claim 1 wherein said projector means is affixed to the windshield of said vehicle by a suction cup mounting; said suction cup mounting further including a swivel head.

12. A video viewing system as recited in claim 1 wherein said vehicle further includes a roof rack; said projector means being mounted upon said roof rack.

13. A video viewing system as recited in claim 1 wherein said projector means fastened to a spring loaded rod; said spring loaded rod being disposed generally vertically inside said vehicle.

14. A video viewing system as recited in claim 10 wherein said vehicle further includes a flexible stand affixed to the floor thereof; said projector means being removably attached to said flexible stand.

15. A video viewing system as recited in claim 1 wherein said screen is generally rectangular in shape.

16. A video viewing system as recited in claim 1 wherein said screen is attached to said vehicle by a suction cup mounting.

17. A view viewing system as recited in claim 16 whereby said suction cup mounting further includes at least one tiedown for stabilizing said screen.

18. A video viewing system as recited in claim 1 wherein said vehicle further includes a roof rack; said roof rack having at least one extension arm, said screen being removably attached to said extension arm.

19. A video viewing system as recited in claim 1 wherein said screen is foldable or collapsible for ease of storage.

20. A video viewing system as recited in claim 1 wherein said screen is positionable between a first position and a second position, said first position being furled about a core, said second position being unfurled and maintained in a generally vertical disposition.

21. A video viewing system as recited in claim 1 wherein said screen is unfurled automatically via an electric motor.

22. A video viewing system comprising:

a vehicle;

a video projector means being engaged to said vehicle;

a source means being engaged to said vehicle, said source means being selected from the group consisting of an electromagnetic storage device player, an optical storage device player, and a laser disc player;

a generally rectangular screen providing a viewing area; and fastening means for removably attaching said screen to said vehicle, said fastening means having a suction cup mounting.

23. A video viewing system as recited in claim 22 wherein said suction cup mounting further includes a swivel head member.

24. A video viewing system as recited in claim 22 wherein said vehicle further includes a roof rack; said fastening means including an extension arm that is attached to said roof rack; said screen being mounted upon said extension arm.

25. A video viewing system for use in relation with a vehicle having a power supply means, comprising:

power connection means engaged to said vehicle power supply means and functioning to provide power in a predetermined format, said power connection means having an alarm for sounding when a voltage from said supply means drops below a predetermined minimum voltage level;

source means for providing at least one video output signal, said source means being operatively connected to said power means, said source means being selected from the group consisting of an electromagnetic storage device player, an optical storage device player, and a laser disc player;

projector means for receiving said at least one video output signal from said source means and converting said video output signal into video images, said projector means being operatively connected to said power means;

viewing means for providing a viewing area for said video images, said viewing means being positionable at an extremity of a vehicle for cooperation with said projection means such that said video images are projected onto said viewing means; and fastening means for removably connecting said viewing means to said vehicle, said fastening means being selectably removable from said vehicle. a video projector means being engaged to said vehicle; a source means being engaged to said vehicle; a generally rectangular screen providing a viewing area; and fastening means for removably attaching said screen to said vehicle.

* * * * *